United States Patent [19]
Ealding

[11] 3,839,238

[45] Oct. 1, 1974

[54] FOAMED POLYOLEFINS

[75] Inventor: Cyril John Ealding, Puckeridge, Nr. Ware, England

[73] Assignee: Imperial Chemical Industries Limited, London, England

[22] Filed: Mar. 1, 1971

[21] Appl. No.: 119,713

Related U.S. Application Data

[63] Continuation-in-part of Ser. No. 724,237, April 25, 1968, abandoned.

[52] U.S. Cl. ... 260/2.5 E, 260/2.5 HA, 260/33.2 R, 260/33.6 PQ, 260/33.8 UA, 260/41 R, 260/41 AG, 260/88.1 R, 260/88.2 F, 260/93.7, 260/94.9 GD, 260/857 L, 260/873, 264/DIG. 5

[51] Int. Cl. ........................................... C08f 47/10

[58] Field of Search ............... 260/2.5 E, 2.5 HA; 264/DIG. 5

[56] References Cited
UNITED STATES PATENTS

| | | | |
|---|---|---|---|
| 3,227,784 | 1/1966 | Blades et al. | 260/2.5 E |
| 3,287,477 | 11/1966 | Vesilind | 264/53 |
| 3,452,123 | 6/1969 | Beckmann et al. | 260/2.5 E |
| 3,491,173 | 1/1970 | Kobsa | 260/2.5 HA |

*Primary Examiner*—Wilbert J. Briggs, Sr.
*Attorney, Agent, or Firm*—Cushman, Darby & Cushman

[57] ABSTRACT

Producing foamed polyolefines by injecting a blowing agent system comprising an excess of a first substance which is completely miscible with the molten polyolefine and is normally liquid, and a second normally gaseous substance the critical temperature of which is less than the temperature at which the polyolefine is foamed and which has a solubility of at least 0.01 percent in the polyolefine into an extruder.

4 Claims, 1 Drawing Figure

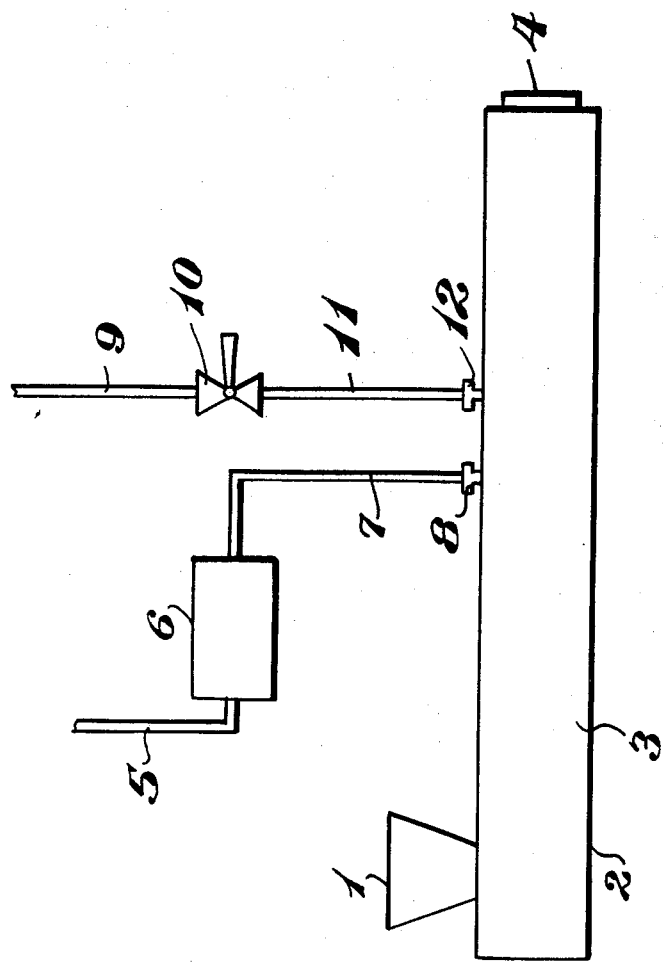

FOAMED POLYOLEFINS

This application is a continuation-in-part of application Ser. No. 724,237 filed April 25 1968, and now abandoned.

This invention relates to foamed polyolefines and a process for their production.

It is an object of the present invention to provide a low density foamed polyolefine which contains a minimum of non-thermoplastic material and which has a small cell size.

Accordingly, I provide a process for the production of a foamed polyolefine by extruding the polyolefine in admixture with a blowing agent system from an extruder of high internal pressure to a zone of lower pressure in which the improvement comprises injecting into the extruder so as to mix with the molten polyolefine therein a blowing agent system which comprises from 10 to 50 percent, by weight of the polyolefine, of a first blowing agent which is completely miscible with the molten polyolefine at said high pressure, said first blowing agent having a critical temperature above the temperature at which the polyolefine is extruded and having a boiling point at said lower pressure which is below the temperature at which the polyolefine issues into the zone of lower pressure and a second blowing agent in an amount up to 10 percent by weight of the polyolefine, said second blowing agent having a solubility of at least 0.01 percent by weight in the polyolefine under the conditions of temperature and pressure at which the polyolefine is extruded and a critical temperature below the temperature at which the polyolefine is extruded.

It is to be understood that when in this specification I refer to a homogeneous solution, I mean the solution of molten polyolefine and blowing agent system and do not exclude the presence of other materials such as inert fillers or excess of the second blowing agent dispersed therein as a separate solid or gaseous phase.

Any polyolefine may be foamed according to the process of my invention, e.g. polymers and copolymers of ethylene (low or high density), propylene, butene-1, 4-methyl pentene-1, including copolymers of olefines and unsaturated acids in which at least 10 percent of the carboxylic acid groups are neutralised by metal ions as described in British Specification No 1,011,981. Mixtures of polyolefines may be used.

I also provide novel foamed polyolefine articles which are of low density, in particular I provide foamed polyolefines of density 0.05 to 0.5 g/cc, preferably 0.1 to 0.4 g/cc.

I further provide foamed polyethylene which is characterised by the presence after disintegration with fuming nitric acid of needle shaped fragments, a major proportion of which have a length of from 5 to 20 microns and a length to width ratio of at least 50 to 1 and are uniaxially oriented. The method used for the disintegration with fuming nitric acid is that described by Palmer & Cobbold in Die Makromolekulare Chemie, 1964, Vol. 14, pages 174–189. The disintegrated material is then examined by electron microscopy. X-ray diffraction patterns obtained from individual needle shaped fragments are characteristic of uniaxial orientation since the patterns obtained are in the form of spots as compared to the rings obtained from randomly oriented polymer.

In the process of the present invention I use from 10 to 50 percent by weight of the polyolefine of the first blowing agent. The amount used is in excess of the amount required to cause the polymer to foam and the excess of the blowing agent vaporises on extrusion thus absorbing latent heat from the polyolefine as it emerges from the extrusion die and foams. In this way the foamed polyolefine is set in its foamed state.

If smaller quantities of the first blowing agent are used, all the blowing agent will vaporise before the polyolefine has solidified. This will permit the foam structure to disappear or be modified since there will be insufficient cooling of the foamed polyolefine by the vaporising blowing agent to cause it to solidify while there is still sufficient gas pressure generated by the blowing agent system to maintain the foam structure.

I have found that the best results are obtained using 20 to 45 percent by weight of the first blowing agent, based on the weight of the polyolefine.

The blowing agent system is injected into the molten polyolefine as it passes along the barrel of the extruder through which the molten polyolefine is passed and this is important because an excess of the first blowing agent is used which means that the mixture of the polyolefine and the blowing agent is generally too fluid to be fed directly to the feed hopper of the extruder.

In addition, generally the polyolefine and first blowing agent are not miscible in the cold. Consequently a mixture of the two would consist of a slurry which would not feed satisfactorily to the feed hopper. Also the first blowing agent would be liable to boil off from the feed section of the extruder, back through the feed hopper, with consequent fire risk where the first blowing agent is inflammable, as the incompletely fused polyolefine would not exert a sufficient barrier to the passage of the vaporised blowing agent backwards through the feed section. These problems are overcome by the injection of the first blowing agent directly into the barrel of the extruder beyond the feed section i.e. into the melt of the polyolefine. This technique allows a good control over the quantity of the blowing agent added.

The second gaseous blowing agent is also injected into the molten polyolefine as it passes through the barrel of the extruder. Preferably the second gaseous blowing agent is injected at a different point to the first blowing agent as injecting them together would necessitate injecting a solution of the second blowing agent in the first blowing agent, in which the second blowing agent may have only a limited solubility, or else maintaining a homogeneous mixture of the two phases in the pumping lines which is difficult to ensure. Consequently the system would be less versatile.

It is sometimes necessary to provide a constriction in the extruder upstream of the point or points where the blowing agents are introduced and this may be achieved by modification of the screw or, in the case of a multiscrew extruder, the screws, of the extruder so that a build up of pressure is achieved prior to the constriction and a region of comparatively low pressure occurs after the constriction. The blowing agents are then introduced into such a low pressure region (the pressure of which may in practice be of the order of 1000 psi) which is hereinafter referred to as a "decompression zone".

Either or both blowing agents may be injected into the decompression zone by means of a metering device. In the preferred case where the first blowing agent is a liquid and the second a gas, the liquid may be injected into the decompression zone by a piston, diaphragm or other metering pump which leads to an oscillation of pressure within the decompression zone. By supplying the second gaseous blowing agent to the decompression zone through a non-return valve at a pressure within the range of pressure oscillations produced by the liquid metering pump, the supply of the blowing agent is also automatically controlled by the liquid metering pump.

The first blowing agent may be injected using a displacement pump while the second blowing agent may be injected utilising a pressure difference between a high pressure reservoir, for example a gas cylinder, of the second blowing agent and the extruder barrel. A typical system for introducing the blowing agents is illustrated schematically in the drawing.

The polyolefine is fed to a hopper 1 of a screw extruder 2 wherein it is melted in a feed section 3 and extruded through a die 4. The first blowing agent is fed from a supply via pipe 5 to a metering pump 6 from whence it is injected into the polyolefine melt in the extruder barrel via pipe 7 and an injection port 8 fitted with a non-return valve. The second blowing agent is fed from a constant pressure supply via pipe 9 to a pressure regulating valve 10 from whence it passes into the molten polyolefine via pipe 11 and an injection port 12 fitted with a non return valve. The blowing agents are thoroughly mixed with the polyolefine melt in a mixing section of the extruder screw between the injection ports and the die 4.

The extruder may be fitted with any suitable die to produce the end product of the required shape, e.g. tube, sheet, filament or angled section, or with a crosshead die which could be used for wire covering. Since it is found that the best foaming is produced when the distance over which the pressure drop from the interior of the vessel to the atmosphere is as short as possible, I prefer to use a die having a short land.

The first and the second blowing agents are selected so that they are inert with respect to the polyolefine under the pressure and temperature conditions of the pressure vessel.

The first blowing agent which is completely miscible with the polyolefine to be foamed may be a solid, a liquid or a gas at normal temperature and pressure. It must, however, have a boiling point below the temperature at which the homogeneous mixture is released from the pressure vessel at the pressure prevailing in the region into which the mixture is released (which will normally be atmospheric) so that foaming will occur at that temperature. It will be understood from the above that I do not include in the present invention blowing agents which cause foaming solely because of decomposition at an elevated temperature. At the same time the first blowing agent must be, as stated above, a good solvent for the polyolefine under the conditions of pressure and temperature existing in the decompression zone and in practice this means that, for example, a vapour having a critical temperature below the temperature of said zone would not be suitable as the first blowing agent of our invention. In view of this and other limitations, I have found that the most suitable substances for use as the first blowing agent are liquids whose boiling points at atmospheric pressure are greater than room temperature, i.e., 20°C, and are at least 10°C below the temperature at which the homogeneous mixture is released from the pressure vessel.

Examples of liquids which may be used as the first blowing agent in my invention include saturated hydrocarbons such as pentane, hexane, heptane, octane; unsaturated hydrocarbons such as pentene, 4-methyl pentene, hexene; petroleum ether fractions; and halogenated hydrocarbons such as methylene chloride, or 1,1-,2-trichloro-1,2,2-trifluoroethane. The particular liquid chosen for a given polyolefine is of course limited by its miscibility with the polyolefine under the conditions of the pressure vessel as well as by the requirement that its boiling point should be 10°C or more below the temperature when the homogeneous mixture is released from the pressure vessel.

I have found that very suitable first blowing agents for polyolefines include pentane, 1,1,2-trichloro-1,2,2-trifluoroethane, hexane, petroleum ether (B.P. 40° to 60°C or 60° to 80°C) and methylene chloride.

In order to produce low density foamed articles of density from 0.1 to 0.4 g/cc from polyolefines, more first blowing agent than is required to cause foaming is used and a concentration of the first blowing agent of at least 10 percent is normally required. If a concentration of first blowing agent of more than 50 percent is used, then the product is expensive to produce and there is a tendency for the cell walls in the foamed product to collapse so that an unsatisfactory product is obtained.

Because of the requirement that its critical temperature should be less than the temperature of the homogeneous mixture on its release from the pressure vessel, the second blowing agent is normally a gas although certain low boiling liquids may be used especially in the case of a high melting polymer. It is essential that the second blowing agent should have at least some solubility (0.01 percent) in the polyolefine and/or the first blowing agent under the conditions of pressure and temperature within the pressure vessel since otherwise there will not be sufficient of the second blowing agent in the homogeneous mixture to nucleate a large number of very small bubbles on emergence from the pressure vessel and nucleation may also arise from the first blowing agent with the result that a small number of very large bubbles are produced and the product is of little commercial use. The particular second blowing agent used will, of course, depend upon the nature of the polyolefine but I have found that carbon dioxide, nitrogen, air (for polymers or first blowing agents not subject to oxidation), methane, ethane, propane, ethylene, propylene, hydrogen, helium, argon and halogenated derivatives of methane and ethane, e.g., tetrafluorochloroethane, are examples of substances which may be used. Carbon dioxide or nitrogen are particularly suitable because of their ready availability and safety in use.

I prefer to add as much of the second gaseous blowing agent as possible but not substantially more than will exceed its solubility which is usually fairly low, i.e., less than 10 percent.

The solubility of the second, gaseous, blowing agent depends of course on the nature of the second blowing agent, the nature of the polyolefine, the temperature and pressure in the extruder, and to some extent on the amount and nature of the first blowing agent.

In considering the solubilities of inert gases, e.g., $N_2$, in polyolefine and hydrocarbon first blowing agents, the following considerations apply. For non-hydrocarbon first blowing agents they also act as a guide.

Above the melting point of the polyolefine, the first blowing agent and the polyolefine will be infinitely miscible. A given weight of first blowing agent/polyolefine mixture will have somewhat greater solubility for the second blowing agent than that of the same weight of the polyolefine alone, because the entropy of mixing will be increased by the presence of the low molecular weight material. (Other minor changes will occur due to the changed ratio of $CH_3$ to $-CH_2-$ groups). For example it has been found that a pressure of approximately 480 psi is necessary to keep 1 percent by weight of nitrogen in a mixture of equal parts by weight of low density polyethylene and pentane at 113°C, whereas 840 psi is necessary to maintain solution in a mixture of 3 parts by weight of polyethylene to one part by weight of pentane, at the same temperature.

Also the dependence of solubility on pressure depends on Henry's law at pressures sufficient to keep the first blowing agent from volatilising.

The temperature dependence on solubility is not large. Raising the temperature of the 3:1 mixture from 113°C to 157°C requires only an additional 60 psi to maintain 1 percent of nitrogen in solution.

Published information on such systems is meagre. Durril & Griskey (A.I. Chem. E.J. 12. No 6. p. 1147) show that at 190°C, 255 psi maintains 0.125 percent of nitrogen in pure polyethylene. Applying Henry's law and correcting for temperature, about 1900 psi would be necessary to maintain solution of 1 percent of $N_2$ in pure polyethylene at 112°C. From Lundberg, Wilk and Huyett's work. (J. Appl. Phys. 31. 1131, 1960) 1500 psi will keep approximately 0.9 percent of $N_2$ in solution at 125.8°C. They show that in the range of interest, solubility increases with pressure, but slightly less than proportionately, and that contrary to what has been found for solvent/polymer mixtures, solubility increases with temperature. This is contrary to the usual experience of permanent gases dissolving in condensed phases.

The foregoing will enable those skilled in the art to estimate what range of solubility to expect and hence what injection pressure to use for the second blowing agent for any chosen set of temperatures and compositions.

Generally pressure limitations dictate how much of the second gaseous blowing agent may be incorporated and normally the amount of second blowing agent will be within the range 0.1 to 1.5 percent, preferably 0.2 to 1.0 percent, by weight of the polyolefine.

It will be understood, as mentioned above, that some excess of the second blowing agent above its solubility may be added (although this is not preferred), this excess being present in finely divided gaseous form and that this excess is not inconsistent with the requirement of homogeneity which refers to the dissolved material.

Since the foam nucleating agent in my process is a soluble gas and not, as in some systems previously used, a solid particle, the foam may be produced free from non-thermoplastic contaminants and thus is very suitable for electrical applications where a high dielectric strength and low power factor are required. The system of my invention is also cheap when readily available blowing agents are used.

For non-electrical applications, however, other additives such as pigments, fillers, which may be in the form of fibres of, e.g., glass, asbestos or a thermoplastic fibre of higher melting point than the main bulk of the polymer, e.g. in the case of polyethylene, polyamide or polyester fibres, dyes and heat or light stabilisers, may be incorporated in the mixture. As mentioned above, it will be understood that, in this case, "homogeneous mixture" as used earlier in this document will in the case of particulate additives be suitably modified to refer only to the thermoplastic itself and the first and second blowing agents.

When the low density polyolefine materials are produced they are as stated above generally open cellular in nature and are thus porous to air having a permeability to air as measured by B.S. 2925 of at least 0.0005 $ml/cm^2/sec/cm$ head for 0.015 inch thickness material. They have a permeability to water vapour as measured by B.S. 3177 of from 500 to 10,000 $g/m^2/day/mil$. Under differential pressure they are also permeable to liquids, and, for example have a permeability to water of at least 0.5 $ml/m^2/min/cm$ head for 0.024 inch thickness material. Since the foamed polyolefine has capillary like pores therethrough created by the open cell foam structure the permeability to water is not directly proportional to the applied water pressure but instead is proportional to the difference between the applied pressure and the pressure required to counteract the surface tension of the water. The permeability to water is measured on a circular sample 8.5 cm diameter clamped horizontally to which water from a constant head is applied. Initially all the air in the sample is removed by applying the water to the upper side of the sample and, when droplets appear on the underside, the sample is inverted. The water flow rate through the sample is measured by measuring the quantity passing through in a given time. This is done for four different heads of water, all of which are less than 50 cm and which are above the head required to counteract the surface tension (which will of course vary depending on the pore size of the foam: typical values of the head required to counteract the surface tension range from 10 to 30 cm). The volume flowing in unit time is plotted against the applied head and the permeability, $k$, calculated from the slope of the graph according to the equation $$k = V/TA \cdot 1/P\text{-}p$$

where $V$ is the volume in ml flowing in $T$ minutes through the sample of $A$ sq. metres under an applied head of water of $P$ cm, a head of $p$ cm being required to counteract surface tension.

It is possible to control the porosity of the product particularly when the material is extruded in the form of a tubular film which on leaving the extrusion die is inflated before being collapsed and hauled off between nip rollers. This material may be used for a large number of uses where its porosity is an asset. Examples of such uses include bed linen such as sheets, blankets and pillow covers where the porosity to air combined with, in the absence of any differential pressure, impermeability to liquids is very useful; surgical dressing; clothing, e.g., overalls, underwear or party dresses in which seams may be formed either by conventional methods such as stitching or preferably by welding; upholstery covers, e.g., for car seats, roof sarking, sacks and sacking, absorbent lining for footwear, protective film, e.g., for furniture or vehicles during transit; wall-paper or backing for wall-paper. The foamed film may also be embossed and it may be vacuum formed. They may also be used as very light packaging materials, particularly when some porosity is required, e.g., in the packing of bread, pastry or vegetables or in packaging dessicants, e.g., for placing in laboratory instruments to eliminate water, in the production of padding foams, e.g., in upholstery for seats or mattresses, for the production of porous irrigation pipes, e.g., for use in greenhouses. For this latter application the pipe is normally made of such a strength that it will withstand at least a 12 foot head of water; the water oozes from the pipe rather than emerging as a spray as it would in the conventional sprinkler system and this has the advantage of reducing soil erosion effects and giving a lower rate of water loss due to evaporation.

Further uses include heat or sound insulants, e.g. in wire covering and capacitor dielectrics, in the production of non-woven materials, e.g. leather or, after needling punching, felt, and as decorative tapes, ribbons and filaments which may be made into woven articles. A further and important use of my materials is as a writing or printing base. They are particularly suitable for outdoor use, e.g. as posters. The material has a printability when measured by the Tappi Routine Control Test No. 19 represented by a $k$ & $N$ number of about 45.

The invention is illustrated but in no way limited by the following examples.

In the following examples a 1¼ inch diameter extruder is used, the screw of which is so designed that at the point of the barrel where the blowing agents are introduced there is a region where the pressure is comparatively low compared with that upstream of the point.

EXAMPLE 1

Polyethylene of melt flow index 0.7 (2.16 kg, 190°C) was fed at a rate of 30 g per minute into the extruder described above. The screw of the extruder was rotated at 40 r.p.m. A reciprocating piston pump was used to introduce into the decompression zone petroleum ether of boiling point 40° to 60°C at such a rate that 44 percent by weight of the polyethylene was introduced. Carbon dioxide was also supplied to the decompression zone through a non-return valve at a pressure of 500 psi. The resultant homogeneous mixture was extruded from an annular die at a temperature of 107°C and foaming occurred at the die lips. The pressure drop across the die lips which had a land length of about 0.01 inch was 100 psi. To avoid creasing of the foamed extrudate this was blown into a bubble 2½ inch diameter using a pressure of 0.5 inch mercury which was collapsed and hauled off by rotating nip rollers.

The resultant product had a density of 0.12 g./cc and had a satin-like texture. Its thickness was 0.027 inch and the percentage of closed cells as estimated by the procedure described by Remington and Pariser in "Rubber World," May 1958, pages 261 to 264 was 44 percent. The average cell diameter as determined by microscopy was 120 microns. The tensile strength at break of the material was 250 psi in the direction of extrusion and 100 psi in the transverse direction. The tensile modulus was 5,000 psi in the direction of extrusion and 1,300 psi in the transverse direction.

EXAMPLE 2

Polyethylene of melt flow index 0.7 was fed to the same extruder as in Example 1 at a rate of 53 g per minute, the extruder screw being rotated at 70 rpm. Petroleum ether of boiling point 60° to 80°C was pumped into the decompression zone at a rate such that 31 percent by weight on the polymer was introduced and using the same system of injection as before, carbon dioxide was introduced at a pressure of 500 psi. An annular die of the same dimensions as in Example 1 was used, the pressure drop across the die being 100 psi and the die temperature 100°C. The inflation pressure of the bubble was 0.75 inch mercury and the bubble diameter 5¼ inches.

The resultant extruded tubular foamed film had a density of 0.42 g./cc, a thickness of 0.0065 inch and the percentage of closed cells was 20 percent. The tensile strength at break of the material was 540 psi in the direction of extrusion and 580 psi in the transverse direction, and the tensile modulus was 7,100 psi in the direction of extrusion and 4,000 psi in the transverse direction.

EXAMPLE 3

Polyethylene of melt flow index 0.7 was fed to the same extruder as that used in Example 1 at a rate of 60 gm/min, the extruder screw being rotated at 90 rpm. Petroleum ether of boiling point 40° to 60°C was pumped into the decompression zone at a rate such that 33 percent by weight of the polymer was introduced and nitrogen was also introduced at such a pressure that 1 percent by weight of the polymer of nitrogen was present. The foamed material was extruded at a temperature of 106°C through semi-radical die lip 0.75 inch in diameter. The pressure drop across the die was 275 psi and the lay flat tubing produced had a width of 1.5 inch and was hauled off at a rate of 12 ft/min.

The resultant foamed film had a density of 0.35 g/cc, a thickness of 0.024 inch and the percentage of closed and open cells it contained was respectively 12 and 50 percent. It had an average cell diameter of from 150 to 200 microns and the tensile strength at break of the material in the direction of extrusion and in the transverse direction was respectively 440 and 280 psi. The water permeability of the material varied between 0.6 and 2.7 ml/m² min cm head and its permeability to air was 0.00072 ml/cm² sec cm head.

EXAMPLE 4

Polyethylene of melt flow index 0.7 containing 5 percent by weight of titanium dioxide was fed to the same extruder as that used in Example 1 at a rate of 89 g./min, the extruder screw being rotated at 130 rpm. The concentration of the first blowing agent, which was petroleum ether of boiling point 40° to 60°C, was 32 percent by weight of the polyethylene and that of the second blowing agent, which was nitrogen, was 1.25% by weight. The material was extruded through a 6 inch diameter annular die at a temperature of 107°C and the pressure drop across the die was 550 psi.

The foamed film was produced at a density of 0.162 g./cc, was of thickness 0.014 inch and had an average cell diameter of about 220 microns. The tensile strength at break was 310 psi in the extrusion direction and 120 psi in the transverse direction. The tear strength of this material was measured by the Elmendorf method and found to be 2.8 g./thou in the extrusion direction and 4.5 g./thou in the transverse direction. The stiffness of the film was measured by recording the force required to bend a sample of the film at a position 1 cm away from the point where it was held by a clamp and found to be 2.6 g cm in the extrusion direction and 0.5 g cm in the transverse direction. The material contained 70 percent of open cells and 12 percent of closed cells and the co-efficient of friction between two sheets of the material was 0.5. Its surface resistivity was high being greater than $1.2 \times 10^{15}$ ohms/sq. The material had a Printing Opacity of 85 percent, a Brightness relative to magnesium carbonate standard of 93 percent and a Gloss of 64 percent. When subjected to the IGT printability test, the product showed no signs of "picking" when tested at printing speeds of up to 620 ft/min using a standard low viscosity testing oil. The air porosity of the material was 0.02 ml/cm² sec cm head.

EXAMPLE 5

The conditions of Example 4 were repeated except that 0.9 percent of an antistatic agent comprising the condensation product of one mole of tallow amine with 2 moles of ethylene oxide was added to the polymer in the extruder.

The resultant product had properties similar to those of the product produced from Example 4 with the exception that its surface resistivity was $1.2 \times 10^{11}$ ohms/sq.

EXAMPLE 6

The process and conditions of Example 4 were repeated except that in this case 10 percent titanium dioxide filler was mixed with the polymer prior to extrusion.

The resulting product was similar in its properties to that produced in Example 4 with the exception that its printing opacity was 90 percent.

EXAMPLE 7

Polyethylene containing 5 percent of titanium dioxide of melt flow index 0.7 was fed to the same type of extruder as that used in Example 1 at a rate of 98 g/min, the extruder screw being rotated at 130 rpm. The first blowing agent was petroleum ether of boiling point 40° to 60°C (33 percent by weight on the polymer) and the second blowing agent was nitrogen (1 percent by weight on the polymer). A 6 inch diameter die was used and the pressure drop across the die was 450 psi, the extrusion temperature being 106°C. The product produced was of density 0.135 g./cc and of thickness 0.018 inches and its average cell diameter was about 250 microns, the material containing 7 percent closed cells and 78 percent open cells. The tensile strength in the extrusion direction and the transverse direction was respectively 215 and 95 psi and the tear strengths in these directions were respectively 2.17 g./thou and 3.50 g./thou. The stiffness was 4.3 g cm in the extrusion direction and 1.9 g cm in the transverse direction and the co-efficient of friction between two sheets of the material was 0.52. The printing opacity of the product was 84 percent. The Brightness relative to a magnesium carbonate was 91 percent and the product showed no signs of "picking" when tested at printing speeds of up to 620 ft/min on the IGT printability tester using a standard low viscosity testing oil. The air permeability of the product was 0.03 ml/cm² sec cm head, and the water vapour permeability was 6,500 g/m² d mil.

Cell size and cell wall thicknesses

These dimensions were measured by microscopy, in the case of the cell wall thicknesses using a Baker interference microscope.

IGT Pick Resistance

This test is carried out by means of an IGT Pick Tester in which a strip of the material to be tested is affixed to a sector of a cylinder which is mounted in circumferential contact with an inking roll containing a standard testing oil which may be of low, medium or high viscosity so that when the sector is rotated the inking roll is also caused to rotate. In operation the sector is accelerated from rest in a controlled way so that the speed of any part of the sector (and so of the strip attached thereto) as it makes contact with the inking roller is known. The strip is then removed from the sector, the point at which the testing oil coverage begins to become patchy observed and the corresponding speed of the sector at that point noted. This is the IGT pick resistance. The point on the strip at which the strip surface is itself ruptured may also be noted.

K & N Ink No.

This test is a measure of ink absorbency. Excess ink is applied to the sample to be measured and left for 2 minutes after which time the ink which is still excess is wiped off the sample. The amount of light reflected from a standard source from this sample into a light measuring instrument is measured and compared with the light reflection from an untreated sample of the same material. The measuring source is adjusted to give a reading of 100 units with the untreated sample and the K & N No. is the number of units by which the reading obtained from the treated sample falls short of 100.

Gloss

This is a measure of the light reflecting properties of a surface. Reflected light is polarised in one direction but diffused light is not. The total amount of light emanating from a standard source which is reflected and diffused from the surface of the sample being measured is thus first measured by a light measuring instrument and adjustment made so that a reading of 100 units is thereby obtained from this instrument. A polariser is then inserted between the surface of the sample and the measuring instrument so that the reflected light is removed. The difference between the reading now obtained and 100 units is the gloss.

Brightness

The total light reflected by the sample is compared with that reflected from a standard sample of magnesium oxide and the result expressed as a percentage.

Printing Opacity

Light is shone from a standard source onto ten thicknesses of the sample to be measured which are backed by an opaque material. The total light reflected from the sample is measured by a light measuring instrument and the reading adjusted to 100 units. The procedure is then repeated using one thickness only of the sample and the reading obtained is the measure of opacity.

I claim:

1. A process for the production of a foamed article in which a blowing agent system is injected into at least one molten polymer selected from the group consisting of polymers and copolymers of ethylene, polymers and copolymers of propylene, polymers and copolymers of butene and polymers and copolymers of 4-methyl pentene-1 in a screw extruder and mixed therein to form a homogeneous mixture which is continuously extruded from a region of elevated temperature and pressure in the extruder to a region of lower pressure, said blowing agent system comprising 20 to 50 percent by weight, based on the weight of the polymer, of a first blowing agent which is completely miscible with the molten polymer at said elevated temperature and pressure and which has a critical temperature above said elevated temperature and a boiling point at said lower pressure below said elevated temperature, and from 0.01 to 10 percent by weight, based on the weight of the polymer, of a second blowing agent which has a solubility, at said elevated temperature and pressure, of at least 0.01 percent by weight in the polymer and a critical temperature less than said elevated temperature, the amount of said second blowing agent being not in excess of its solubility at said elevated temperature and pressure.

2. A process according to claim 1 in which said homogeneous mixture is extruded into a zone at atmospheric pressure and said first blowing agent is a liquid whose boiling point, at atmospheric pressure, is greater than room temperature and is at least 10°C below said elevated temperature.

3. A process according to claim 1 in which the amount of said first blowing agent is from 31 to 50 percent by weight, based on the weight of the polymer.

4. A process according to claim 1 wherein the polymer is polyethylene.

* * * * *